July 29, 1941.   E. S. PEARCE   2,250,811
JOURNAL BOX LUBRICATING EQUIPMENT
Filed April 6, 1940   5 Sheets-Sheet 1
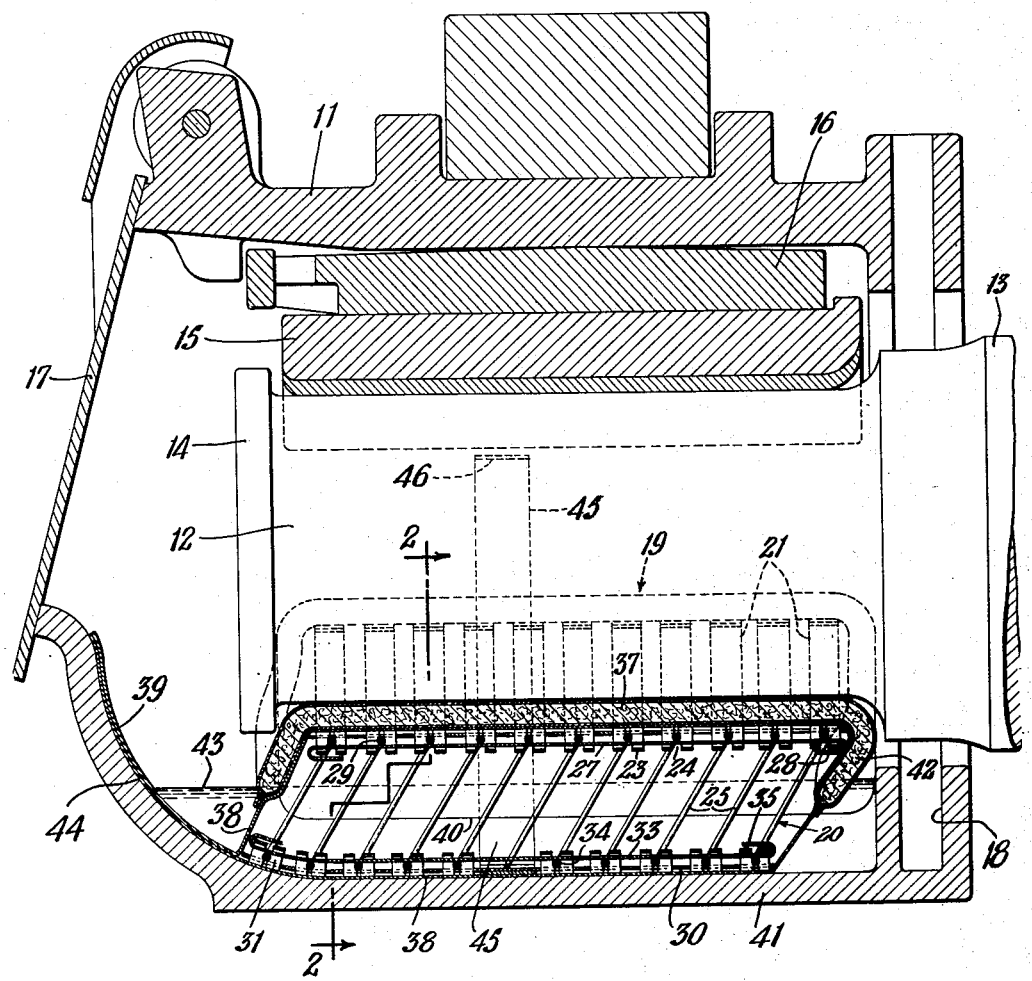
Fig: 1.
INVENTOR:
Edwin S. Pearce
BY
ATTORNEYS.

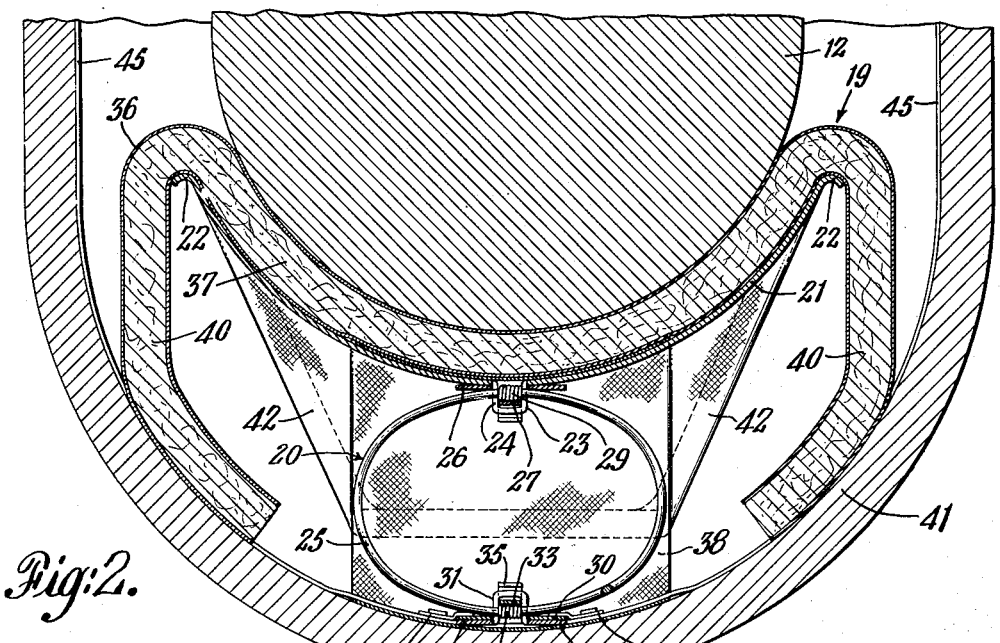
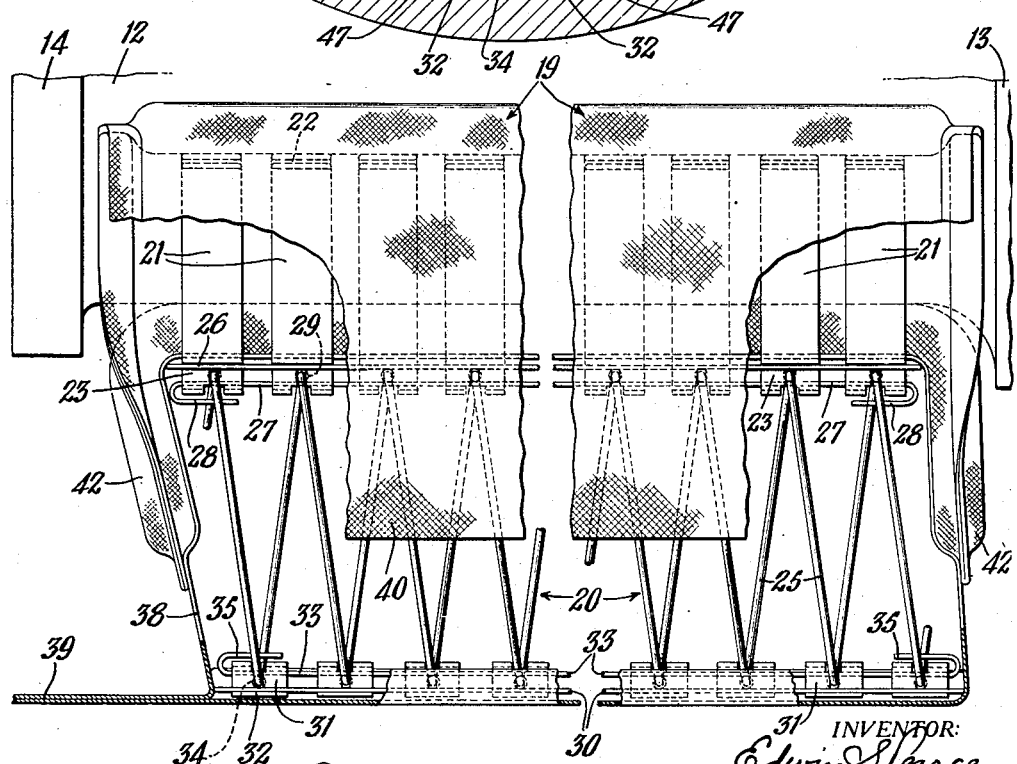

July 29, 1941.　　　E. S. PEARCE　　　2,250,811
JOURNAL BOX LUBRICATING EQUIPMENT
Filed April 6, 1940　　　5 Sheets-Sheet 3

INVENTOR:
Edwin S. Pearce
BY Synnestvedt & Lechner
ATTORNEYS.

July 29, 1941.   E. S. PEARCE   2,250,811
JOURNAL BOX LUBRICATING EQUIPMENT
Filed April 6, 1940   5 Sheets-Sheet 4
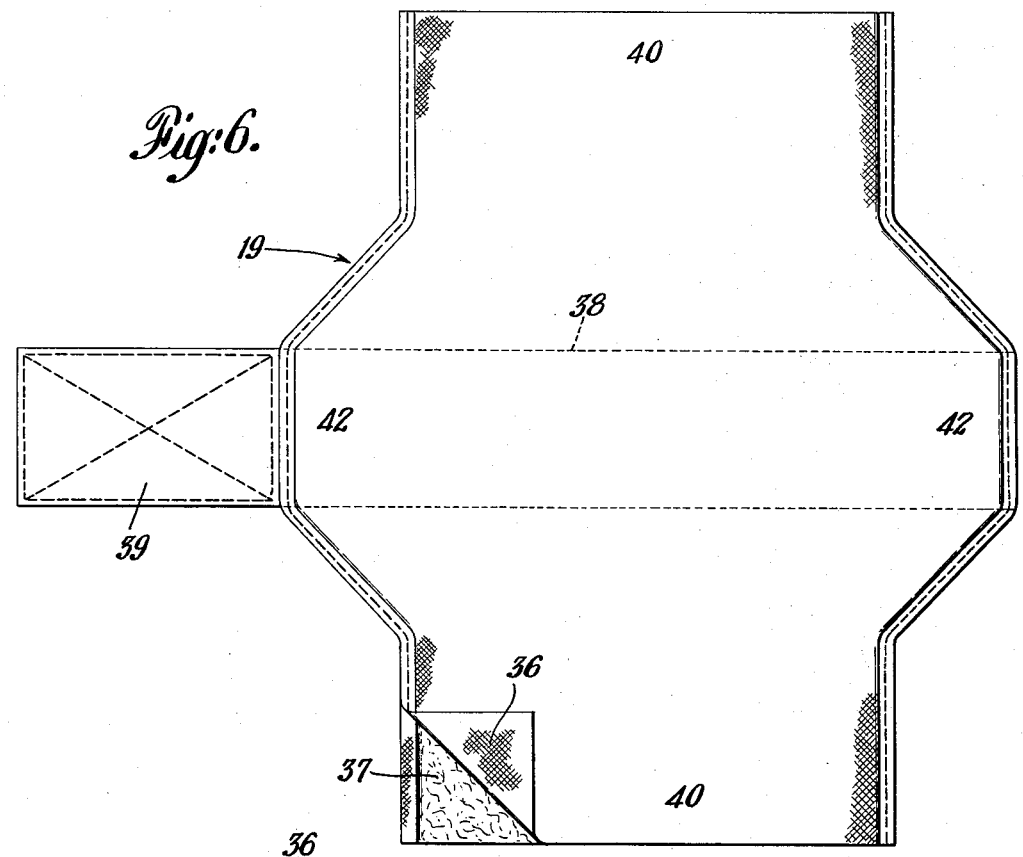
Fig:6.
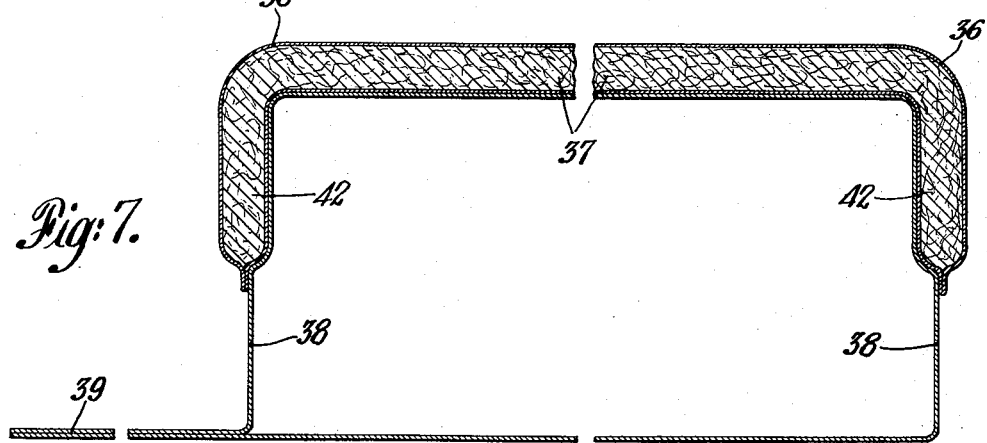
Fig:7.

July 29, 1941.  E. S. PEARCE  2,250,811
JOURNAL BOX LUBRICATING EQUIPMENT
Filed April 6, 1940  5 Sheets-Sheet 5

INVENTOR:
Edwin S. Pearce
By Synnestvedt & Lechner
ATTORNEYS.

Patented July 29, 1941

2,250,811

UNITED STATES PATENT OFFICE 2,250,811

JOURNAL BOX LUBRICATING EQUIPMENT

Edwin S. Pearce, Indianapolis, Ind.

Application April 6, 1940, Serial No. 328,169

13 Claims. (Cl. 308—88)

This invention relates to the lubrication of railway axle journals and is particularly concerned with an improved lubricating equipment adapted to be used in the customary axle journal box.

The principal object of the invention is to provide lubricating equipment by means of which it is possible to materially reduce the operating temperatures of the parts, especially of the journal and of the bearing, and thereby improve the general efficiency and dependability of the usual railway axle journal bearing.

Before reciting certain other objects of the invention which are more or less incidental to the principal object but closely related thereto, I wish to refer to certain discoveries which I have made with respect to the operating characteristics of journals of the character with which the present invention is concerned, because the objects and advantages of the invention will be better understood and appreciated if these discoveries are kept in mind.

For example, after extensive experiment and test, I have found that the relative temperatures of certain of the parts under normal operating conditions are as follows: The journal has the highest temperature and the bearing the next highest. Following these comes the oil film between the journal and the bearing, next the wedge on top of the bearing, then the journal box packing, then the top of the journal box, and finally, and at the lowest temperature, the bottom and sides of the journal box. It has also been discovered in suitable test equipment that, under certain conditions, the journal will run at a considerably higher temperature with the customary oil-saturated waste where the bearing is removed than it will with the bearing under full load. Furthermore, my investigation has shown that the greater the pressure and corresponding density of the ordinary journal box packing mass, the greater will be the journal temperature.

With the foregoing in mind, I will now recite certain other objects of my invention. These include the provision of lubricating equipment which will exert a minimum and substantially uniform pressure against the under side of the journal; the provision of such equipment which provides a path for the travel of journal heat downwardly and outwardly to the cooler bottom and side portions of the walls of the box; the provision of a lubricating equipment which will avoid, to as great an extent as possible, the insulating effect for dissipation of the heat now incident to the customary dense packing materials, such as waste, especially when the waste is firmly packed into position as is generally the case in a mistaken effort to ensure good lubrication; and the provision of a lubricating equipment in which there is a continuous metal path along which the heat can travel from the journal to the free oil pool in the bottom of the journal box where the temperature is the lowest.

Still other objects of the invention include the provision of a special lubricating pad for the journal which can be made to contact with the sides of the journal box so as to further aid in the dissipation of the heat, the provision of a lubricating pad which will reduce to a minimum the quantity of lint which will accumulate in the oil; the provision of a lubricating pad which has a wear-resistant journal contacting member and a lubricant feeding member or wick having extremely high capillary feeding capacity; the provision of a lubricating pad from which the lubricant feeding member can be readily separated from the wear resisting member; the provision of a lubricating unit in which the lubricating pad can be readily separated from the metal part of the unit, replaced with another so that the dirty one can be sent to a central cleaning point and properly cleaned and returned to service; the provision of a lubricating unit which may be easily applied or removed without removal of the bearing or the wedge and with the box in operating position on the axle and in the truck; the provision of a lubricating unit which will make possible the use of oils of lower viscosity than could safely be employed with previous lubricating equipment; and in general the provision of lubricating equipment which will reduce the cost of operation and maintenance and avoid tie-ups due to hot boxes.

Preferred embodiments of the invention are illustrated in the accompanying drawings, wherein—

Figure 1 is a vertical longitudinal section through a journal box showing my improved lubricating equipment installed therein, the bearing being new or substantially new so that it shows little, if any, wear.

Figure 2 is a partial transverse section on an enlarged scale taken as indicated by the line 2—2 of Figure 1.

Figure 3 is a partial view similar to that of Figure 1 but on an enlarged scale and showing the position of the parts when the bearing has worn and must be replaced.

Figure 6 is a plan view of the lubricating pad employed with my invention.

Figure 7 is a vertical longitudinal section through the lubricating pad in substantially the position it would occupy when in service but with the metallic supporting parts omitted.

Figure 4:
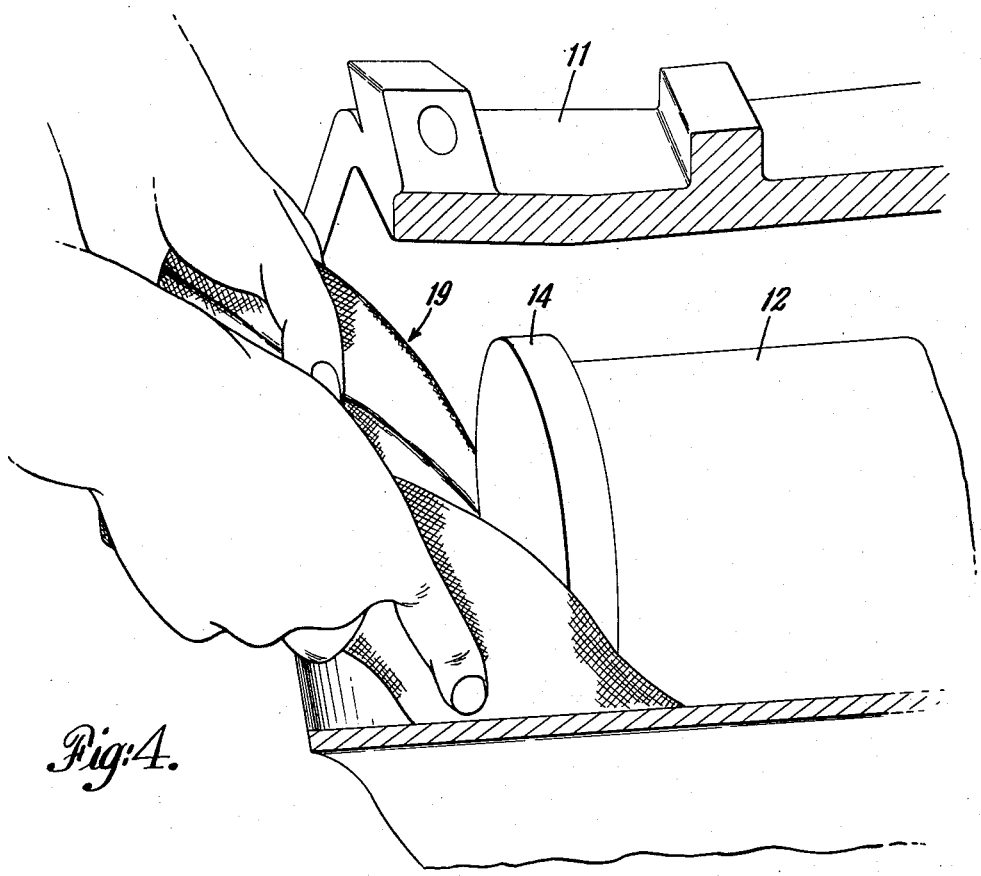
Figure 4 is a perspective view with the side of the journal box broken away in order to illustrate the manner in which my improved lubricating unit is inserted in the box.

Referring first to Figures 1 to 5 inclusive, it will be seen that I have illustrated a typical railway car journal box 11 in which is housed the customary journal 12 on the end of the axle 13. The journal has the usual end collar 14 and rotates in the crown bearing 15 above which is the usual wedge 16. The opening in the end of the box through which the lubricating equipment is inserted or removed is closed by the familiar lid 17 and at the opposite end the box is provided with the dust guard cavity 18.

My improved lubricating equipment comprises the pad lubricating member or mat proper 19 and the metallic resilient supporting structure indicated as a whole by the reference character 20. The supporting structure will be described first. It consists of a plurality of resilient fingers or leaf-spring members 21 which are curved to conform to the curvature of the journal, the curvature being preferably on a radius which is somewhat less than the radius of the curvature of the journal itself, so that the fingers will tend to press toward the journal and further so that the device can be adapted to journals of different sizes.

The fingers extend upwardly on each side of the journal to a distance which might be said to correspond roughly to the height of the waste or packing heretofore customary in this art, and the ends of the fingers are provided with rounded lips 22 so as not to cut or injure the pad which hangs thereover in a manner to be described hereinafter. The center portion of each finger is bent downwardly into the form of a U-shaped securing portion 23 through which is cut a transverse slot 24 adapted to embrace a turn of the coil spring 25.

In assembling the fingers upon the coil spring in the manner indicated, a spacer bar 26 is first applied over the U-shaped portions 23 of a row of fingers, the spacer bar being provided with suitable apertures for this purpose. The dimensions of the apertures are just sufficient to permit ready assembly or disassembly while at the same time serving to positively fix or hold the fingers in a predetermined spaced relationship. Following this, the fingers with the spacer bar are placed over the turns of the coil spring 25 and then a spring steel locking strip 27 is passed along the inside of the turns of the coil and its ends 28 are bent over to serve as locks. Finally, a series of small coil springs 29 which have previously been placed upon the turns of the coil spring 25, are soldered or otherwise secured in position on the turns of the coil so as to prevent all circumferential movement of the fingers with their spacer bar upon the turns of the coil spring 25. The small spacer springs 29 fit down in the U-shaped portions 23 so that they do not project upwardly beyond the upper face of the supporting fingers, where they would interfere with the lubricating pad and might even injure the journal. It will be understood, of course, that any other type of positioning means might be employed for holding the fingers in fixed circumferential position on the turns of the coil spring, but I have found that the small springs illustrated and described can be very conveniently soldered in place in order to perform the desired function.

Diametrically opposite to the spacing bar 26 is a similar spacing bar 30, and associated with this bar are a plurality of U-shaped spring embracing pieces 31 which correspond exactly to the U-shaped pieces 23 of the spring fingers 21, these spring embracing members 31 being provided with suitable transverse slots for embracing the turns of the coil spring just as in the case of the U-shaped members 23. However, the members 31 have only short lateral flanges 32 which fit under the bottom face of the spacer bar 30. The individual turns of the coil spring 25 are then secured in place in exactly the same manner as just described in connection with the fingers 21, as by means of the spring steel locking strip 33 and another series of small coil springs 34 soldered to the turns of the coil spring 25. The ends 35 of the strip 33 are bent over as before described in connection with the strip 27.

It will be seen that the structure just described forms a metallic backing and supporting means for the lubricating pad which is well adapted to conduct heat away from the journal down into the oil pool in the bottom of the box where it can be rapidly dissipated through the relatively cool walls of the box. The fingers 21 proper, in themselves, constitute a resilient support for the pad which conforms to the curvature of the journal inasmuch as the supporting spring 25 is secured against the convex face of the fingers. The turns of the spring 25 can be readily pushed or folded over into the position shown in Figure 5, so that the lubricator can be easily collapsed for insertion in and removal from the box. In addition, the structure is of such a nature, i. e., jointed and resilient throughout, that the supporting unit as a whole can be flexed to a substantial degree in a longitudinal direction, as will be clear upon inspection of Figure 4, which shows the complete lubricating unit in the process of being inserted beneath the journal which it is to lubricate. Furthermore, by arranging the supporting coil spring 25 with its axis horizontal and in substantial parallelism with the axis of the journal, it is possible to provide for a minimum upward pressure against the journal, which pressure is substantially uniform throughout the length of the device as well as throughout the period of its use, regardless of wear which may take place in the bearing 15. When the device is first installed with a new bearing, the parts assume the position shown in Figure 1 where the spring 25, while somewhat collapsed, still has its coils not so very far removed from the vertical and, therefore, at a point where they will exert a relatively small degree of pressure against the under face of the journal. After the bearing has worn, the coils of the spring, of course, will assume a more nearly vertical position as indicated in Figure 3, which figure shows the maximum degree of wear which it is practical to permit before replacing the bearing 15.

I will now describe the lubricating pad proper. This consists of an outer envelope 36 composed of some relatively strongly wear-resistant facing material of a somewhat loosely woven nature so as not to interfere with the passage of oil therethrough and an inner lubricant feeding member or wick 37 of relatively soft and highly absorbent material capable of rapid passage of oil by capillary action. The wear-resistant member need not necessarily have any inherent oil feeding capacity because its primary function is simply to provide a wear-resistant facing against the journal. It might even take the form of some suitable type of woven metallic screening.

The general shape of the pad is shown to best advantage in Figure 6, which illustrates it in flat position before being applied to the metal supporting parts. On its under side the pad is provided with a loop or band 38, one side of which is firmly sewed to the under side of the outer envelope member 36 as shown most clearly in Figure 7. The band has a projecting or tab portion 39 formed by bringing the two ends of the loop into registry and firmly stitching them together. The band may be made from some relatively heavy strong material, such as canvas or cotton duck, because, as will appear below, it is intended to be used as a means for removing the lubricating equipment from the box without danger of damage to the pad proper. The loop or band 38 is adapted to fit around the coil spring 25, as will be clear upon inspection of the drawings, with the tab portion 39 falling along the bottom portion of the entrance neck of the box, as shown in Figure 1.

When in position on the metallic supporting structure the side or wing portions 40 of the lubricating pad fall downwardly over the curved lips 22, approximately into the position indicated to best advantage in Figure 2, with the lower portions thereof, at least, in contact with the curved side and bottom wall 41 of the journal box. The end portions 42 of the pad turn downwardly at each end of the journal approximately as shown in Figures 1 and 3, and all of these downwardly hanging portions are adapted to dip into the bath of oil 43 in the bottom of the box so that they can serve as wicks for transmitting the oil to the surface of the journal.

Figure 5:
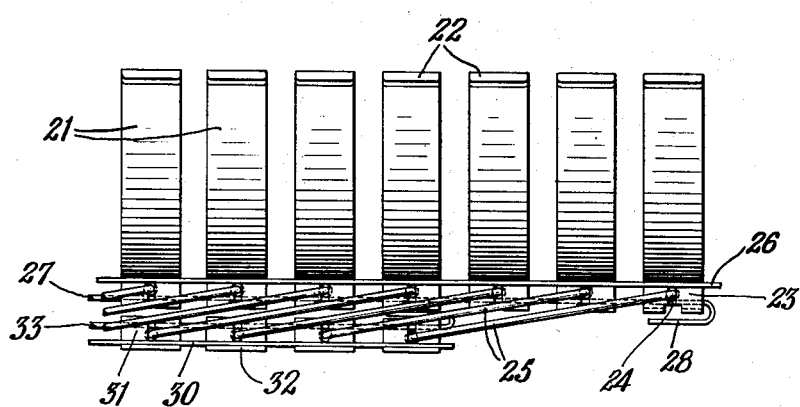
Figure 5 is a fragmentary side elevation of the resilient metallic supporting structure which I employ for the lubricating pad, showing the manner in which the support is collapsed or folded over during insertion or removal as will further appear.

In inserting my improved lubricating equipment into a journal box, it is, of course, necessary first to place the pad in proper position on the metallic supporting structure, with the ends and sides hanging downwardly as just described and with the band 38 surrounding the coil spring 25. The operator then collapses the device, holding it approximately as shown in Figure 4, and passes it downwardly and inwardly into the bottom of the box and under the journal, so that upon release of the pressure when in its final position it can expand and force the pad against the under face of the journal. During this operation the turns of the coil spring are folded over as shown in Figure 5 and the unit as a whole is flexed longitudinally as may be necessary to bring it into proper position.

As will be obvious upon inspection of the drawings, it will be seen that my improved device lends itself extremely well to insertion and removal through the relatively narrow space which exists between the bottom of the collar 14 on the journal and the nearest adjacent point 44 on the entrance neck of the box. Removal of the unit is made very easy by virtue of the band 38 and the tab 39, the latter being in convenient position to be grasped by the hands and being sufficiently strong to safely resist the necessary pull. At this point I wish to note the fact that the tab and the band should be arranged in such a way that the tab lies along the bottom of the box so that the pull is along the bottom of the spring 25. The upper portion of the device will come into contact with the inside of the bottom of the collar 14 and as the tab 39 is pulled, the device will be suitably collapsed by virtue of its reaction against the collar 14 as the tab is pulled out and when it is sufficiently collapsed it will slip through the space between the collar and the point 44 and out through the opening of the box. This can be accomplished without danger of tearing or disrupting the pad proper, so that the pad can be shipped to a central point for cleaning and return to service.

In order to keep the lubricating equipment from moving or sliding out of its correct position in a direction circumferential of the journal, I provide the transversely extending spring-steel centering strip 45, the sides of which are adapted to frictionally engage the inside of the box walls as shown to best advantage in Figure 2. Each end of this spring is turned inwardly to provide an abutment or shoulder 46 which normally is spaced slightly beneath the lugs of the bearing. Ordinarily the frictional contact of the spring 45 with the sides of the box is sufficient to hold the device in proper position, but if it should slip slightly no damage can result because the abutments 46 will come up against the under face of the bearing lugs and stop all further movement. In order to secure the spring 45 to the supporting structure, one of the U-shaped members 31 near the center of the coil spring 25 is omitted and the spring 45 passes under the spacer plate or bar 30 at this point. Opposed clips 47 are riveted or otherwise secured to the spring 45, the inner ends of which clips are raised so as to project over the spring spacer bar 30.

Figure 8:
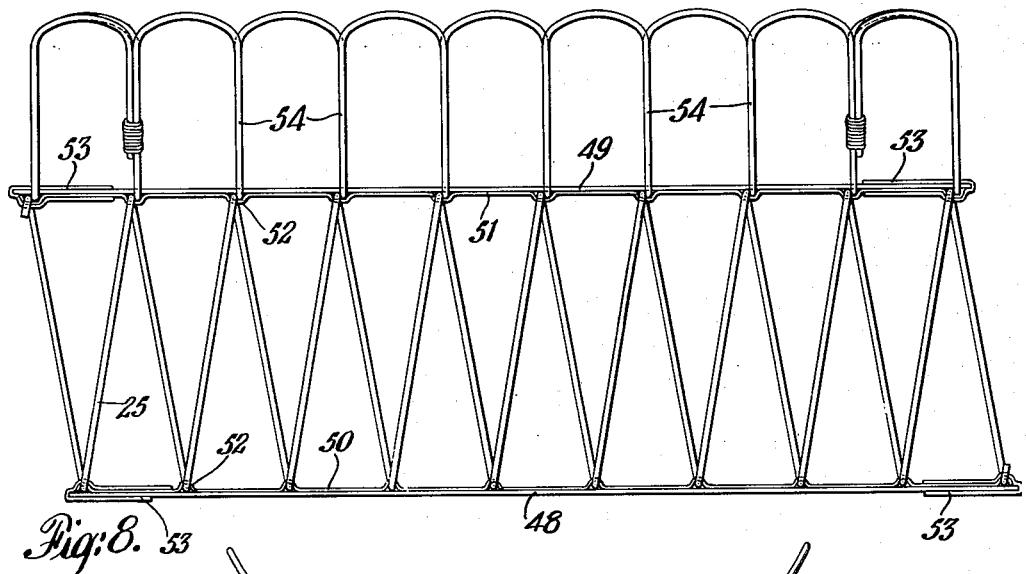
Figure 8 is a side elevation of a modified type of resilient supporting member.
Figure 9:
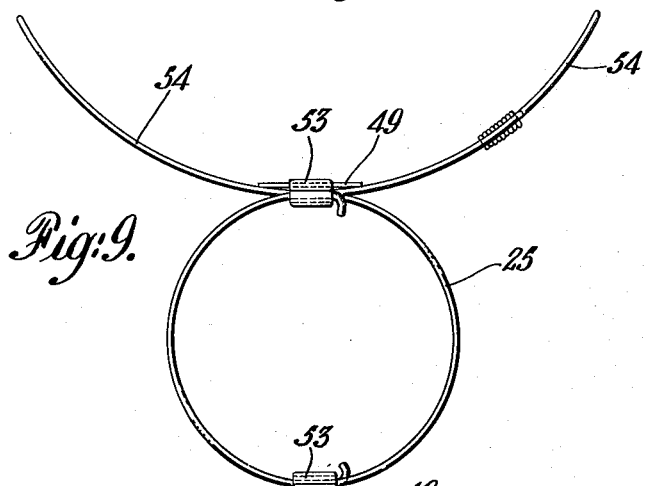
Figure 9 is an end elevation of the structure of Figure 8.

The modified supporting member illustrated in Figures 8 and 9 includes a coil spring 25 just as in the device of the previous figures, the turns of which are similarly kept in properly spaced relationship by means of spacer bars or plates 48 and 49, the turns of the coil spring being secured between such spacer bars and locking strips 50 and 51. The locking strips are provided with U-portions 52 which fit over the turns of the coil, and the strips themselves are secured intermediate the turns of the coil to the spacer bars, either by rivets or by spot welding or in any other suitable manner not shown. In this instance the ends of the strips 53 are bent around the ends of the spacer bars as clearly shown in Figure 8.

The pad supporting portion proper of the modified form of structure illustrated in Figures 8 and 9 consists of a length of spring wire suitably looped backwardly and forwardly to form a series of spring fingers 54 which conform to the curvature of the journal as in the case of the fingers 21 of the previous modification. The spacer bars in this structure can be held in fixed circumferential position on the turns of the coil spring 25 in any desired manner, the details of which it is not believed necessary to discuss more fully in view of the description of the previous modification. The device functions in exactly the same manner as the device already described so that no statement in this respect is here required.

Figure 10:
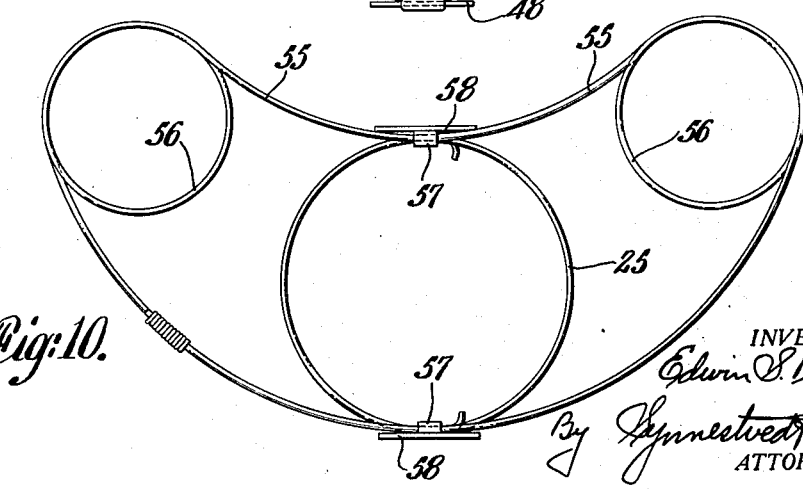
Figure 10 is an end elevation of still another modified form of resilient support.

In Figure 10 the coil spring 25 is again in evidence and is of essentially the same type as the springs 25 described in connection with the previous figures. In this instance, however, the resilient spring supporting fingers 55 are formed with a turn 56 in each finger to give added resilience and strength, all other parts being essentially the same as in Figures 8 and 9, except that the turns of the coil spring 25 are secured by small individual U-shaped portions 57 formed as tongues slit from the spacer bars 58 and bent upwardly and over the turns of the coil and the loops of the spring fingers. The free ends of these tongues are then soldered to the spacer bars.

In the modifications of Figures 8, 9 and 10, a positioning member similar to the positioning member 45 of the previous figures can be employed if desired, although this is not illustrated in the drawings.

In conclusion, I should like to stress certain of the advantages incident to my invention. For instance, the device makes possible the use of a true 100% wick material as the lubricant feeding member, which is not possible with the ordinary waste heretofore employed. As is well known, the customary waste heretofore in use effects a compromise between resilience and absorptive qualities or between resilience and what might be termed "its wicking capacity." With my improvements it is possible, as stated, to use a 100% true "wicking" material inside of a protective or wear-resistant cover, which makes for much longer life and avoids accumulation of lint in the oil. Actually my improved pad serves somewhat in the nature of a filter because it tends to hold back the dirt and the lint while passing the clean oil to the surface of the journal.

The band which surrounds the coil spring 25 is made of very strong material, and when removing the device it is possible to do so by pulling on the band without in any way straining, tearing or distorting the pad proper. This makes it possible to clean the pad and return it to service.

The use of my improved device with its relatively thin pad and minimum pressure against the journal serves to markedly reduce the amount of heat developed by actual friction between the lubricating member and the journal surface. As stated before, this heat is far greater than is realized as is proven by the fact that I have found that the journal runs cooler when a plain bath of oil is employed for its lubrication, instead of a mass of packing or waste as has heretofore been customary. The waste acts as an insulating medium so that the heat generated by its frictional contact with the surface of the journal cannot be readily dissipated. This difficulty is overcome with my improved lubricating equipment because I employ a relatively thin lubricating pad proper which is held against the journal with a minimum of pressure by means of a metallic supporting structure adapted to serve as an excellent medium for dissipating the heat. The heat travels through the supporting structure down into the oil bath and from the oil bath into the walls of the box and so out to the moving air on the outside of the box. In addition, the oil itself is cooled by virtue of the fact that there is a tendency for it to be carried outwardly to the sides 40 of the pad which, as previously described, are made to rub against the walls 41 of the box.

Because of the fact that less heat is generated and whatever heat is generated is more rapidly dissipated, it is possible with my improvements to operate at much lower temperatures than heretofore encountered in similar service, which enables the employment of oils of lower viscosity than heretofore suitable for the purpose. Such oils are generally less expensive and furthermore, they feed more rapidly through the pad to the journal and on the surface of the journal are carried more easily to the area under the bearing. The oil film will not break as easily with my improved device as it will with devices which run at a higher temperature.

What I claim is:

1. Journal box lubricating equipment comprising a lubricant feeding pad, a metallic pad backing means conforming to the curvature of the journal, and a coil spring for supporting the backing means on the bottom of the box so as to hold the pad against the under face of the journal, said spring having its axis arranged longitudinally of the journal box and in substantial parallelism with the axis of the journal.

2. The equipment of claim 1 wherein the coil spring is provided with means for maintaining constant the relative spacing of the upper and lower sides of its individual turns while at the same time permitting longitudinal collapse of the spring.

3. The equipment of claim 1 wherein the pad is provided with a band which is adapted to embrace the spring, said band having a tab at the outer lower edge of the spring whereby the lubricating equipment may be removed without damaging the pad.

4. Supporting structure for a journal box lubricating pad, said structure comprising a metallic backing member curved to conform to the curvature of the journal, and a coil spring secured against the convex side of said backing member with the axis of the spring substantially paralleling the axis of said curved backing member.

5. The structure of claim 4 wherein means are provided along the line of contact between the backing member and the spring and also at the opposite side of the spring for maintaining the turns of the spring in a fixed spatial relationship.

6. Supporting structure for a journal box lubricating pad, said structure comprising a plurality of resilient fingers curved to conform to the curvature of the journal, a coil spring secured against the convex side of said fingers, means for holding the turns of the spring in fixed spatial relationship along the line of contact with said fingers, and means at the opposite side of the spring for holding the turns thereof in correspondingly fixed relationship.

7. The structure of claim 4 wherein a transverse, resilient, box-engaging, centering strip is carried by the coil spring.

8. A resilient support for a journal lubricating device, said support including a coil spring having diametrically opposed spacing bars secured to the turns of the coil whereby to hold them in fixed spatial relationship during longitudinal compression or expansion of the spring.

9. Supporting structure for a journal box lubricating pad, said structure comprising a coil spring, a plurality of individual metallic leaf spring members curved to conform to the curvature of the journal, means for securing the convex side of each leaf spring member to a turn in the coil spring, said members being arranged in a row on one side of the coil and said securing means serving to fixedly space the turns of the coil, and means at the opposite side of the coil spring for holding the turns thereof in correspondingly fixed spatial relationship.

10. The structure of claim 9 wherein each leaf spring member is held against circumferential movement on the coil by fixed abutment means secured to the turns of the coil.

11. Journal box lubricating equipment comprising a lubricant feeding pad, a metallic pad backing means conforming to the curvature of the journal, and a coil spring for supporting the backing means so as to hold the pad against the under face of the journal, said spring having its axis arranged longitudinally of the journal box and in substantial parallelism with the axis of the journal, together with means for maintaining constant the relative spacing of the upper and lower sides of the individual turns of the spring while at the same time permitting longitudinal collapse thereof, said pad being provided with a band which is adapted to embrace the spring and the band having a tab at the outer edge of the spring whereby the lubricating equipment may be removed from the box without damaging the pad.

12. The equipment of claim 1 wherein the pad is provided with a band which is adapted to embrace the spring and by means of which the spring may be collapsed for the purpose of removing the lubricating equipment from the box.

13. Journal box lubricating equipment for use with a journal which has a collar at its outer end, said equipment comprising a lubricant feeding pad having a lubricant feeding member or wick and a wear resistant cover therefor, a metallic pad backing means conforming to the curvature of the journal, a coil spring for supporting the backing means on the bottom of the box so as to hold the pad against the under face of the journal, said spring having its axis arranged longitudinally of the journal box in substantial parallelism with the axis of the journal, and a spring embracing band secured to said wear resistant cover by means of which band the lubricating equipment may be moved to bring its upper outer end into contact with the inner side of the journal collar whereby the spring may be collapsed and the equipment withdrawn as a unit from the box.

EDWIN S. PEARCE.